June 8, 1926.  
F. N. LA CHAPELLE  
STOP MECHANISM  
Filed April 11, 1921  
1,587,965  
3 Sheets-Sheet 1

Witness  
Inventor  
Fred N. LaChapelle

June 8, 1926.

F. N. LA CHAPELLE

STOP MECHANISM

Filed April 11, 1921   3 Sheets-Sheet 2

1,587,965

Witness
M. G. Crozier

Inventor
Fred N. LaChapelle
by his attorneys
Van Everen Fish Hildreth & Cary

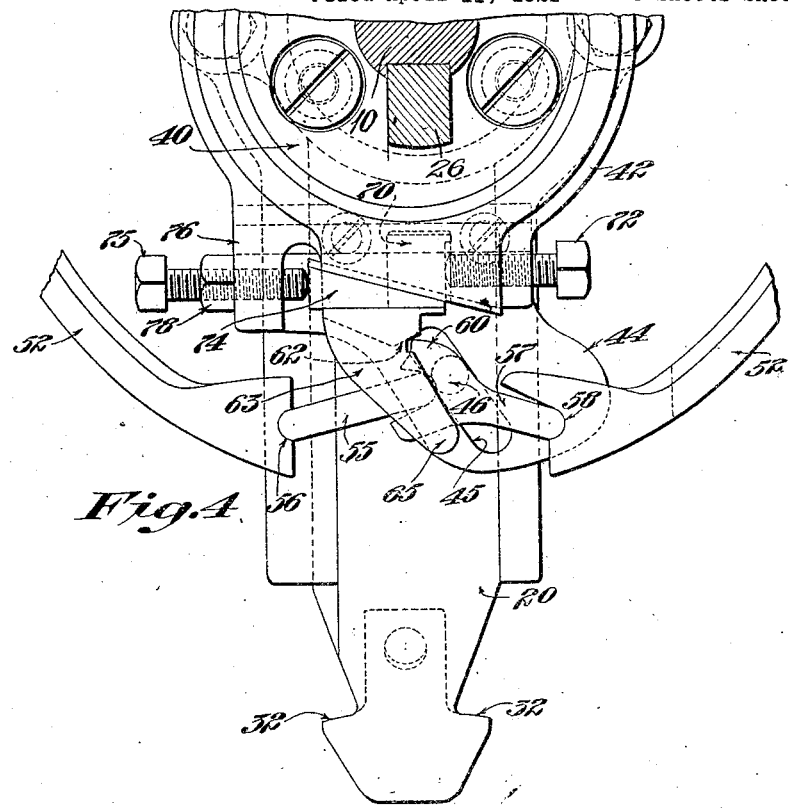

Patented June 8, 1926.

1,587,965

UNITED STATES PATENT OFFICE.

FRED N. LA CHAPELLE, OF BEVERLY, MASSACHUSETTS, ASSIGNOR TO UNITED SHOE MACHINERY CORPORATION, OF PATERSON, NEW JERSEY, A CORPORATION OF NEW JERSEY.

STOP MECHANISM.

Application filed April 11, 1921. Serial No. 460,532.

The present invention relates to stop mechanisms and more particularly to mechanisms of this character designed to automatically stop a machine at a predetermined point in the cycle of operations.

In machines of the type disclosed in La Chapelle Patent No. 1,185,108, dated May 30, 1916, a considerable burden is imposed upon the stopping mechanism, due to the frequent stopping of the machine in operation and the necessity of quickly bringing the moving parts to rest at a substantially predetermined point.

The object of the present invention is to provide a new and improved form of stopping mechanism especially adapted for embodiment in machines of this general character which must be stopped at a substantially predetermined point.

With this object in view the several features of the invention consist in certain novel features of construction, combinations and arrangements of parts hereinafter described and claimed, the advantages of which will be obvious to those skilled in the art from the following description.

Figure 1:
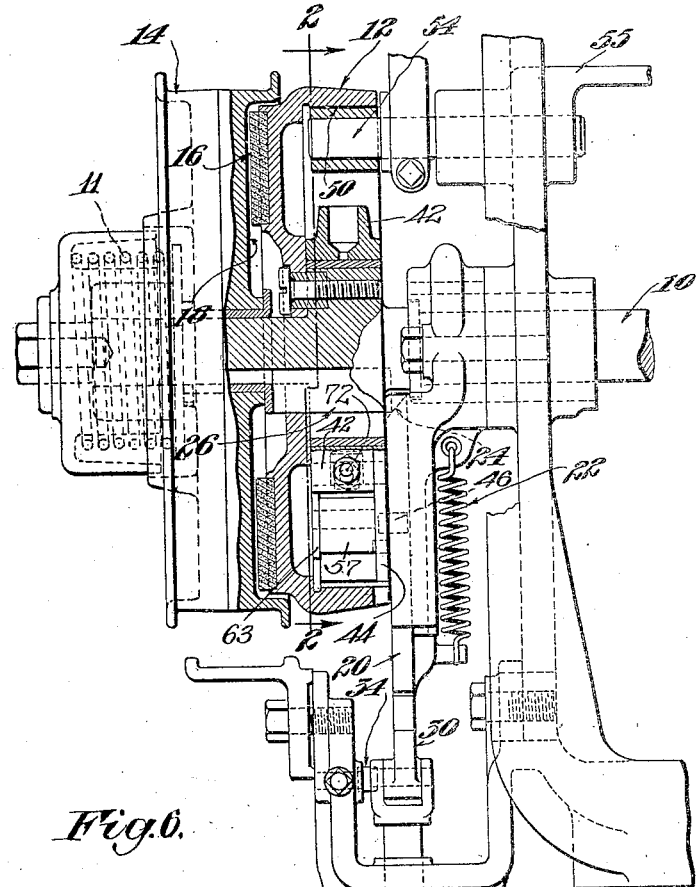
Figure 6:
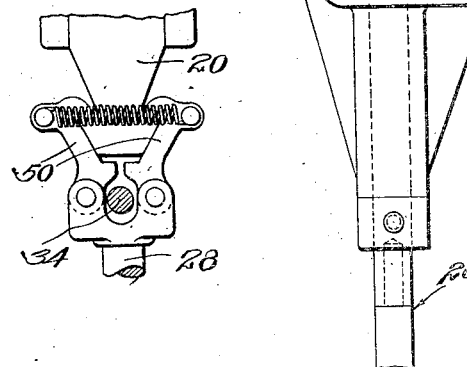
Figure 2:
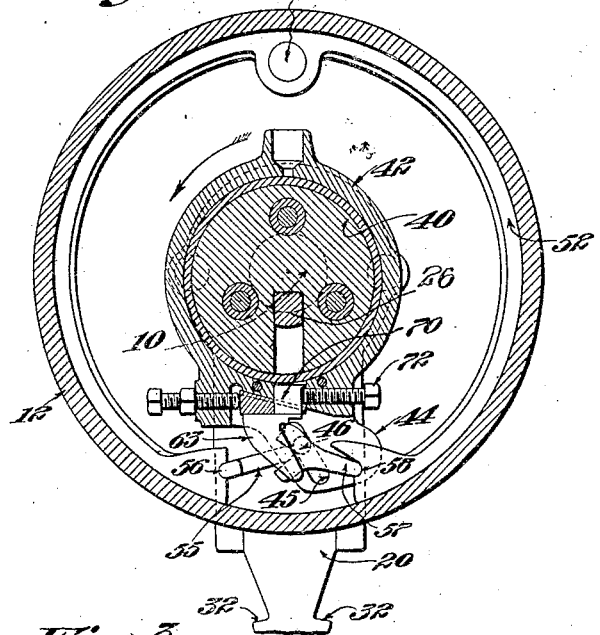
Figure 3:
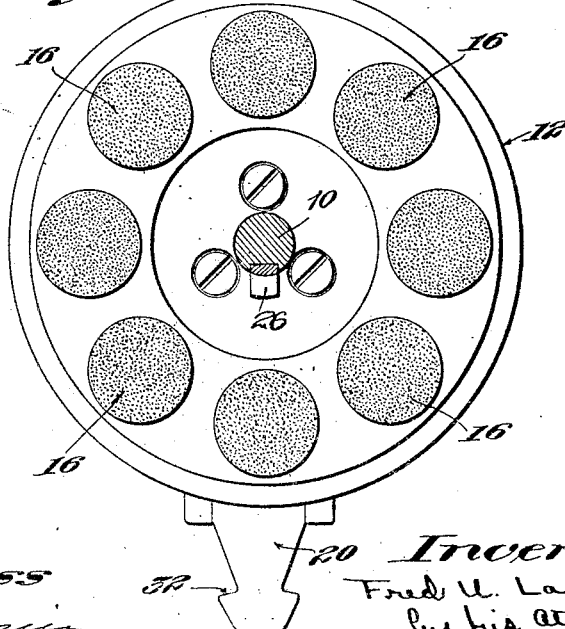

In the accompanying drawings illustrating the preferred form of the invention Fig. 1 represents a front elevation partly in section of the improved stopping mechanism; Fig. 2 is a detail illustrating a section of the brake with a portion of the actuating mechanism therefor taken approximately upon the line 2—2 of Fig. 1. Fig. 3 is a detail illustrating one of the co-operating clutch faces; Fig. 4 is a detail illustrating an elevation of the toggle and actuating connections with the brake in locking position; and Fig. 5 is a similar view illustrating the toggle broken to release the brake. And Fig. 6 is a detail illustrating the treadle operated connections for actuating the clutch slide.

According to the present invention the moving parts of the mechanism are brought to rest in the desired position without a sudden shock or jar. This result is accomplished by the sudden and powerful application of a friction brake at a predetermined time and in a manner to invariably stop the mechanism at the proper point in the cycle. Although the present construction does not embody a stop member or other device for positively determining the stopping point nevertheless the action of the brake is so efficient and its application may be so accurately timed that the stopping point will not vary during a long continued period of operation.

The illustrated embodiment of the invention comprises a main shaft 10 connected with the operating parts of the machine and to which is secured a drum 12 adapted to be clutched to a driving pulley 14, the drum having a series of cork inserts 16 received in the face which frictionally engage with the adjacent face 18 of the driving pulley to clutch the latter to the shaft 10 in the usual manner. The clutch members are normally maintained in engagement in the usual manner by a coiled spring 11 and are separated to release the clutch by a control slide 20 which is designed to move the loose pulley outwardly upon the shaft when elevated by the spring 22, due to the engagement of the wedge shaped upper end 24 of the slide with the inner end of a key 26 secured to the pulley, as shown in Fig. 1. The control slide 20 is connected with a treadle rod 28 through two hook members 30 pivoted to the upper end of the treadle rod and adapted to engage with the shoulders 32 formed upon the lower end of the slide. After the control slide has been depressed sufficiently to start the machine, a continued downward movement of the treadle rod causes a roll 34 to enter between the hubs of the hook members 30, separating these members sufficiently to release the slide which is then returned to the position shown in Fig. 1 by the spring 22. In this position the upper wedge shaped end 24 of the slide engages with the key 26 and releases the clutch after a partial revolution of the shaft 10.

In the present invention the drive shaft 10 of the machine is automatically brought to rest at a predetermined point after the completion of one revolution and without undue jar or shock upon the moving parts. To this end an eccentric 40 is formed integral with the shaft 10 within the drum 12, this eccentric being provided with a strap 42, as indicated more particularly in Fig. 2. The lower end of the eccentric strap is provided with a depending tail 44 having a diagonal slot 45 formed therein. This diagonal slot 45 is engaged by a pin 46 which is mounted upon the controlling slide, the arrangement being such that when the controlling slide is depressed to start the machine the eccentric strap is swung laterally about the eccentric to release the brake member. Cooperating with the inner face 50 of the brake drum 12 is an expanding brake band 52 supported in the upper portion of its circumference upon a stationary stud 54 projecting from a portion of the machine frame 55. The lower portion of the brake band is open and the opposite ends are engaged by a toggle member to expand the brake band against the inner face of the brake drum and stop the rotation of the shaft 10. As shown clearly in Figs. 2, 4 and 5, the operating toggle for the brake band comprises a link 55 engaging at one end in a recess 56 formed in the end of the brake band and a cooperating link 57 engaging in a recess 58 formed in the opposite end of the brake band. The link 57, as shown more particularly in Figs. 4 and 5, is provided with an extension or nose 60 above the junction of the two links which is adapted to be engaged by an inclined face 62 formed upon an actuator member 63 which is adjustably connected with the eccentric strap 42. As will be observed from an inspection of the drawings, the lower end 65 of the actuator member is spaced away from the tail 44 in such a manner that the link 55 and a portion of the link 57 is received in the space formed therebetween, this construction tending to retain the two links of the toggle in assembled relation while permitting the links to move relatively to one another during the expansion and contraction of the brake band.

Upon depressing the control slide, the pin 46 through engagement with the diagonal slot 45 swings the tail 44 bodily to remove the stopping face 62 from engagement with the nose 60 of the toggle link 57, permitting the toggle, as shown in Fig. 5, to release the brake drum. Subsequently to the starting of the machine, the control slide is automatically returned by the spring 22, as previously described, and the pin 46 is returned in the slot 45 to approximately the position shown in Fig. 4. In this position the inclined face 62 engages with the end of the link 57 to straighten the toggle after the shaft 10 has completed one revolution, bringing the parts into approximately the position shown in Fig. 4. This construction serves as the practical equivalent of a positive stop mechanism although the frictional application of the expanding brake member actually brings the moving parts to rest without abrupt shock or jar and without rebound.

In order to accurately control the application of the brake and in consequence the stopping point of the machine, the actuator member 63 is adjustably connected with the eccentric strap by a stem 70 projecting from the actuator member upwardly into a recess formed in the strap and engaged by a holding screw 72 threaded in the strap, as shown in Fig. 4. Upon releasing the holding member the actuator block 63 may be adjusted through the provision of an adjusting wedge 74 interposed between the actuator member and an inclined face formed upon the strap. The desired movement of the adjusting wedge 74 is obtained by an adjusting bolt 75 threaded in the boss 76 and provided with a check nut 78.

While it is preferred to employ the specific construction and arrangement of parts shown and described, it will be understood that this construction and arrangement is not essential except so far as specified in the claims and may be changed or modified without departing from the broader features of the invention.

The invention having been described, what is claimed is:

1. A stopping mechanism comprising a driven shaft, a brake drum connected to the shaft, an expansible brake member adapted to coact with the drum to stop the shaft, an eccentric connected to the shaft, and operating connections between the eccentric and expansible brake member for actuating the latter to clutch and stop the rotation of the drum at a predetermined point in the rotation of the shaft.

2. A stopping mechanism comprising a driven shaft, a brake drum connected to the shaft, a brake band cooperating with the drum, an eccentric rotating with the shaft, a strap for the eccentric, and connections between the eccentric strap and the brake band for causing the brake band to engage with the drum at a predetermined point in the rotation of the eccentric.

3. A stopping mechanism comprising a driven shaft, a brake drum connected to the shaft, an expansible brake band supported within the drum, a toggle for expanding the brake band to clutch the latter to the drum, an eccentric mounted upon the shaft, and an actuator member operated by the eccentric for straightening the toggle at a predetermined point in the rotation of the eccentric.

4. A stopping mechanism comprising a driven shaft, a brake member mounted upon the shaft, a cooperating brake member, a toggle lever for operating the second brake member, an eccentric mounted upon the shaft, and an actuator member reciprocated by the eccentric and adapted to engage with and straighten the toggle lever at a substantially predetermined point in the operation of the eccentric.

5. A stopping mechanism comprising a driven shaft, a brake member secured to the shaft, a cooperating brake member, a toggle lever for operating the second brake member, an eccentric, an actuator member operatively connected with the eccentric and reciprocated thereby to engage the toggle at a predetermined point in the rotation of the shaft, and means for moving the actuator member out of engagement with the toggle to release the brake members.

6. A stopping mechanism comprising a driven shaft, a brake member connected to the shaft, a cooperating stationary brake member, a toggle lever for operating the stationary member, an eccentric connected to the shaft, an actuator member operatively connected with the eccentric and adapted to be reciprocated thereby to engage and straighten the toggle, and means for guiding the reciprocatory movement of the actuator member and for moving the member laterally to disengage it from the toggle.

7. A stopping mechanism comprising two cooperating brake members one of which is stationary, a toggle lever connected to the stationary member for clutching the stationary member to the movable member, a rotary eccentric, an eccentric strap having a portion provided with an inclined slot, a normally stationary pin received in the slot and adapted to determine the path of reciprocation of the eccentric strap, an actuator member connected to the eccentric strap and adapted to engage with and straighten the toggle at a predetermined point in the rotation of the eccentric, and means for moving the pin in the slot to swing the eccentric strap about the axis of the eccentric.

8. A stopping mechanism comprising a rotary brake drum, an expanding brake band cooperating therewith, a toggle lever for expanding the brake band, an eccentric mounted within the brake drum, an eccentric strap having a portion provided with an inclined slot, an actuator member having an abutment face adapted to engage with the toggle lever to straighten the latter, a manually operable control slide, and a pin projecting from the control slide into the slot to normally control the lateral position of the eccentric strap and actuator member.

9. A stopping mechanism comprising a driven shaft, a brake drum secured to the shaft, an expansible brake band received within the drum, a toggle lever connected to the brake band and adapted to expand the latter against the drum, an eccentric connected to the shaft, an actuator member reciprocated by the eccentric and normally adapted to engage with and straighten the toggle during each rotation of the eccentric, and means for controlling the path of reciprocation of the actuator member.

10. A stopping mechanism comprising a driven shaft, a brake drum secured to the shaft, an expansible brake band received within the drum, an eccentric connected to the shaft, a toggle lever for expanding the brake band, and positive connections between the eccentric and toggle lever for straightening the latter at a predetermined point in the rotation of the eccentric.

FRED N. LA CHAPELLE.